April 2, 1935.  W. A. DILLON  1,996,279
STRAINER
Filed April 2, 1934
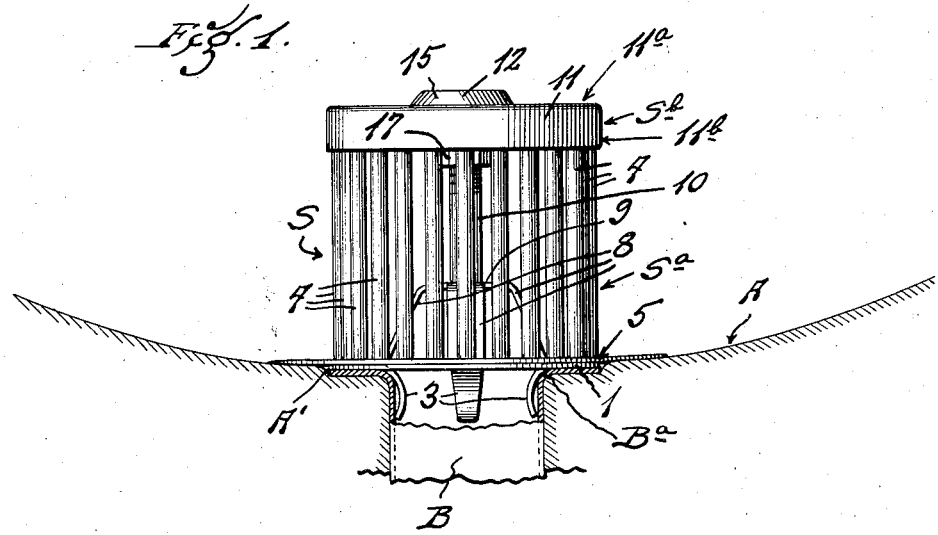
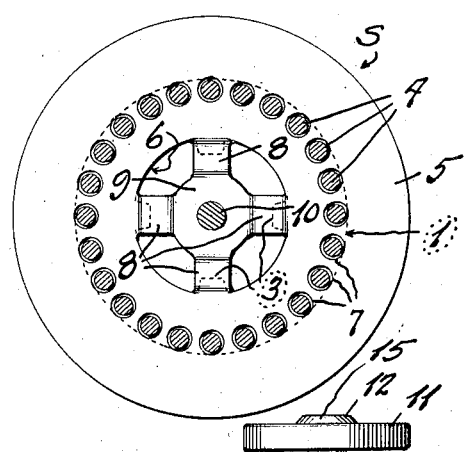
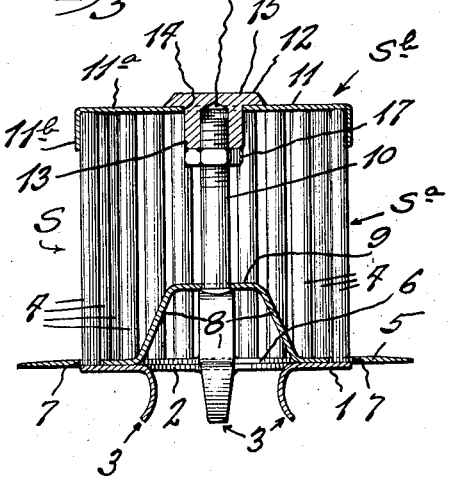
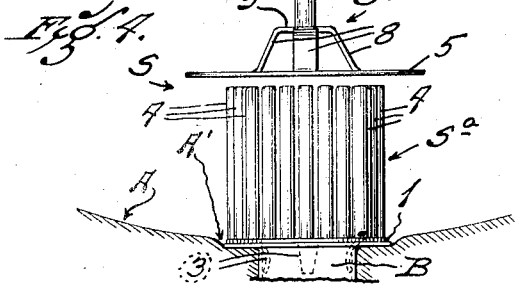
Inventor:
William A. Dillon,
by E. M. Harrington,
Attorney.

Patented Apr. 2, 1935

1,996,279

UNITED STATES PATENT OFFICE 1,996,279

STRAINER

William A. Dillon, St. Louis, Mo.

Application April 2, 1934, Serial No. 718,648

9 Claims. (Cl. 4—292)

This invention relates generally to strainers, and more specifically to strainers of the type adapted for use with drains of washstands, sinks, and the like, for the purpose of preventing clogging of such drains, the predominant object of the invention being to provide an improved strainer of the type mentioned which is capable of performing its intended function in a very efficient manner.

Prior to this invention considerable trouble and annoyance was caused in beauty shops because of the clogging of the drains of washstands by hair which found its way into said washstands. This is true also of washstands and sinks of homes and of various business establishments other than beauty shops where not only hair but other matter caused clogging of drains of said washstands and sinks, with resulting annoyance and inconvenience.

The purpose of the present invention is to eliminate the annoyance and inconvenience which attends clogging of drains of washstands, sinks, and the like, and this purpose is accomplished by providing an improved strainer which is so constructed and is capable of such use that matter which might clog a drain with which the improved strainer is associated is prevented from entering said drain. Also, the improved strainer includes means whereby the matter which is prevented from entering the drain may be removed from the strainer in a very simple and sanitary manner.

Fig. 1 is a fragmentary sectional view of a washstand showing the improved strainer associated therewith.

Fig. 2 is a horizontal section of the improved strainer.

Fig. 3 is a vertical section of the improved strainer.

Fig. 4 is a view on a reduced scale similar to Fig. 1, and showing the manner in which matter that is accumulated at the strainer is removed therefrom.

In the drawing, wherein is shown for the purpose of illustration, merely, one embodiment of the invention, A designates a washstand or other like receptacle which is provided with a drain conductor B of the type known in the trade as a strainer plug. The improved strainer is designated generally by the reference character S, and comprises a portion $S^a$, which is fixedly associated with the strainer plug in a manner to be hereinafter set forth, and a portion $S^b$ which is movably supported by the strainer portion $S^a$.

The strainer portion $S^a$ comprises a plate 1, which is preferably of circular shape and has an opening 2 formed centrally therethrough. At the edge of the opening 2 formed through the plate 1 a plurality of gripping fingers 3 are located, these gripping fingers preferably being formed integrally with the plate 1. The fingers 3 are extended downwardly from the plate 1 and are preferably curved longitudinally, as shown clearly in Figs. 1, 3, and 4. In applying the improved strainer to a drain the gripping fingers 3, which are possessed of some resiliency, are inserted into the strainer plug B, as shown in Figs. 1 and 4, the fingers being contracted or moved inwardly toward each other by the rounded edge $B^a$ of the open upper end of the strainer plug as said fingers are forced into the strainer plug. The described contraction of the fingers causes said fingers to be placed under tension, and such tension causes the lower ends of the fingers to be forced firmly against the inner face of the strainer plug, with the result that the strainer portion $S^a$ is very firmly secured in place.

Extending upwardly from the plate 1 is a plurality of spaced elements 4 which serve as barriers that prevent hair, and other matter which might clog a drain with which the strainer is associated, from passing into said drain. The spacing of the barriers, of course, permits water to move freely between the barriers and pass into the drain. The barriers may be of any suitable shape and dimensions, and they may be separate elements fixed to the plate 1 or integral parts thereof.

The strainer portion $S^b$ comprises a bottom plate 5, which is provided with a centrally located opening 6. Also the plate 5 is provided with a plurality of properly located openings 7 through which the barriers 4 are extended when the strainer portion $S^b$ is in its lowered position. Extended upwardly and inwardly from the edge of the central opening 6 of the plate 5 is a plurality of arms 8 which are spaced circumferentially of said central opening. The arms 8 may be formed integrally with the plate 5, or may be separate elements suitably secured to said plate, and at the upper ends of said arms a horizontal plate portion 9 of reduced diameter is provided. The plate portion 9 has suitably secured to it by welding or otherwise an upstanding rod 10, which is screwthreaded at its upper end portion.

At the upper end of the rod 10 the strainer portion $S^b$ includes a cap 11, which comprises a top horizontal wall $11^a$ having a marginal, downturned flange $11^b$ formed thereon which embraces the upper portions of the barriers 4 when the strainer portion S^b is in normal position with respect to the strainer portion S^a. The cap 11 is provided with a nut 12, which includes a downwardly directed extension 13 that passes through an opening 14 formed centrally of the top horizontal wall of the cap and a top flange portion 15 which contacts with the top face of the top horizontal wall of the cap, as shown most clearly in Fig. 3. The nut 12 is fixedly secured to the cap 11 by means of solder or by other suitable means, and the extension 13 thereof is provided with a screw-threaded opening 16 which receives the upper screw-threaded end portion of the rod 10. Mounted on the screw-threaded upper end of the rod 10 is a lock nut 17 which may be screwed into close frictional contact with the lower face of the extension 13 of the nut 12 for the purpose of preventing unintentional rotary movement of the cap with respect to the rod 10.

In the use of the improved strainer disclosed herein the strainer portion S^a is applied to the strainer plug of the washstand or like structure with which the strainer is associated in the manner already explained herein, and the strainer portion S^b is associated with the strainer portion S^a, as has also been explained. As will be noted on inspection of Figs. 1 and 2, the plate 5 of the strainer portion S^b is of considerably larger diameter than the plate 1 of the strainer portion S^a, and this plate 5 overlaps the plate 1 and the flange of the strainer plug and contacts with the inner face of the washstand A. Also, the marginal portion of the plate 5 is tapered in thickness so that the top face of the plate 5 merges into the face of the washstand, so that a more or less continuous face is provided by the face of the washstand and the top face of the plate 5.

The strainer S being in its normal assembled condition in association with the strainer plug of the washstand or the like, water will pass freely between the barriers 4 and will drain from the washstand through the strainer plug B thereof in the usual manner. However, any hair or other matter which might tend to clog the drain of the washstand if it were permitted to enter the strainer plug will encounter the barriers 4, and movement of such matter toward the drain will be arrested by the barriers. This matter will accumulate at the outer faces of the barriers and above the plate 5 of the strainer portion S^b; and when the water has drained from the washstand the accumulated matter may be removed from the washstand and from the fixed strainer portion S^a by merely moving the strainer portion S^b upwardly with respect to the strainer portion S^a. The upward movement of the strainer portion S^b with respect to the strainer portion S^a strips the matter accumulated at the barriers 4 from said barriers, and after such matter has been removed from the strainer portion S^b in any convenient manner said strainer portion S^b may be replaced in association with the strainer portion S^a for additional use.

Due to the fact that the depression A' in which the top flange of the strainer plug is seated is deeper in some washstands than in others, I make the strainer portion S^b adjustable as to height. In other words, the height of the strainer portion S^b may be increased or decreased by rotating the cap 11 in one or the opposite directions, after which it may be locked in its adjusted position by the lock nut 17. Thus the bottom face of the plate 5 may be made to contact firmly with the inner face of the washstand, while the lower face of the cap 11 contacts with the tops of the barriers 4 even though the distance between the lower portion of the inner face of the washstand and the tops of the barriers varies in different washstands.

I claim:

1. A strainer adapted for use at the drain of a washstand, sink, or the like, comprising a strainer portion provided with barrier means for preventing matter which might clog said drain from entering same, and a second strainer portion for removing matter which accumulates at said barrier means therefrom, said second strainer portion being movable longitudinally of the barrier means of the first-mentioned strainer portion substantially from end to end thereof, so as to strip accumulated matter therefrom.

2. A strainer adapted for use at the drain of a washstand, sink, or the like, comprising a strainer portion provided with barrier means for preventing matter which might clog said drain from entering same, means adapted to fixedly attach said strainer portion to an associated drain, and a second strainer portion for removing matter which accumulates at said barrier means therefrom, said second strainer portion being movable longitudinally of the barrier means of the first-mentioned strainer portion substantially from end to end thereof, so as to strip accumulated matter therefrom.

3. A strainer adapted for use at the drain of a washstand, sink, or the like, comprising a strainer portion provided with barrier means for preventing matter which might clog said drain from entering same, means comprising gripping fingers on said strainer portion adapted to be introduced into and frictionally grip a drain for fixedly attaching said strainer portion to the drain, and a second strainer portion for removing matter which accumulates at said barrier means therefrom, said second strainer portion being movable longitudinally of the barrier means of the first-mentioned strainer portion substantially from end to end thereof, so as to strip accumulated matter therefrom.

4. A strainer adapted for use at the drain of a washstand, sink, or the like, comprising a strainer portion adapted for fixed association with said drain, spaced upstanding barriers forming parts of said strainer portion and arranged so that they surround the drain when the strainer is in use, and a second strainer portion including a plate having openings therein through which said upstanding barriers extend, said second strainer portion being movable upwardly with respect to the first-mentioned strainer portion so that matter accumulated at said barrier may be removed therefrom by said plate.

5. A strainer adapted for use at the drain of a washstand, sink, or the like, comprising a strainer portion, means carried by said strainer portion for fixedly associating said strainer portion with a drain, spaced upstanding barriers forming parts of said strainer portion and arranged so that they surround the drain when the strainer is in use, and a second strainer portion including a plate having openings therein through which said upstanding barriers extend, said second strainer portion being movable upwardly with respect to the first-mentioned strainer portion so that matter accumulated at said barriers may be removed therefrom by said plate.

6. A strainer adapted for use at the drain of a washstand, sink, or the like, comprising a strainer portion, means comprising gripping fingers carried by said strainer portion for fixedly associating said strainer portion with a drain, spaced upstanding barriers forming parts of said strainer portion and arranged so that they surround the drain when the strainer is in use, and a second strainer portion including a plate having openings therein through which said upstanding barriers extend, said second strainer portion being movable upwardly with respect to the first-mentioned strainer portion so that matter accumulated at said barriers may be removed therefrom by said plate.

7. A strainer adapted for use at the drain of a washstand, sink, or the like, comprising a strainer portion including a plate, gripping fingers on said plate adapted to enter a drain for fixedly associating said strainer portion with said drain, spaced barriers extended upwardly from said plate, said barriers being arranged so that they surround a drain with which the strainer is associated, and a second strainer portion including a plate having openings formed therein through which said barriers extend, said second strainer portion being movable upwardly with respect to the first-mentioned strainer portion so that matter accumulated at said barriers may be removed therefrom by said plate of the second-mentioned strainer portion.

8. A strainer adapted for use at the drain of a washstand, sink, or the like, comprising a strainer portion including a plate, gripping fingers on said plate adapted to enter a drain for fixedly associating said strainer portion with said drain, spaced barriers extended upwardly from said plate, said barriers being arranged so that they surround a drain with which the strainer is associated, and a second strainer portion including a plate having openings formed therein through which said barriers extend, said second strainer portion being movable upwardly with respect to the first-mentioned strainer portion so that matter accumulated at said barriers may be removed therefrom by said plate of the second-mentioned strainer portion, and a cap forming a part of said second-mentioned strainer portion and adapted to embrace the upper portion of said barriers.

9. A strainer adapted for use at the drain of a washstand, sink, or the like, comprising a strainer portion including a plate, gripping fingers on said plate adapted to enter a drain for fixedly associating said strainer portion with said drain, spaced barriers extended upwardly from said plate, said barriers being arranged so that they surround a drain with which the strainer is associated, and a second strainer portion including a plate having openings formed therein through which said barriers extend, said second strainer portion being movable upwardly with respect to the first-mentioned strainer portion so that matter accumulated at said barriers may be removed therefrom by said plate of the second-mentioned strainer portion, a cap forming a part of said second-mentioned strainer portion and adapted to embrace the upper portion of said barriers, and means for adjusting the relative positions of said plate and said cap of the second-mentioned strainer portion.

WILLIAM A. DILLON.